United States Patent
Riedemann et al.

(10) Patent No.: US 6,224,171 B1
(45) Date of Patent: *May 1, 2001

(54) METHOD FOR CORRECTING A VEHICLE REFERENCE SPEED

(75) Inventors: Henrich Riedemann, deceased, late of Hannover, by Donate Riedemann, legal representative; Gerald Stanusch, Harsulin; Ingo Tha; Thomas Wolf, both of Hannover, all of (DE)

(73) Assignee: WABCO GmbH, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,480

(22) Filed: Oct. 27, 1998

(30) Foreign Application Priority Data

Oct. 29, 1997 (DE) .............................................. 197 47 689

(51) Int. Cl.$^7$ ....................................................... B60T 8/32
(52) U.S. Cl. .............................................................. 303/195
(58) Field of Search ................................... 303/194, 195, 303/196, DIG. 7

(56) References Cited

U.S. PATENT DOCUMENTS

| 4,733,920 | * | 3/1988 | Pannbacker ........................... 303/195 |
| 5,015,042 | * | 5/1991 | Yoshino .......................... 303/DIG. 7 |
| 5,193,889 | * | 3/1993 | Schaefer et al. ...................... 303/195 |
| 5,388,895 | | 2/1995 | Negrin . |
| 5,615,934 | | 4/1997 | Abuelsamid . |

FOREIGN PATENT DOCUMENTS

| 3901776 | 7/1990 | (DE) . |
| 4314830 | 11/1994 | (DE) . |
| 195 19 767 | 12/1996 | (DE) . |
| 195 19 767 | 12/1998 | (DE) . |
| 0487065 | 11/1991 | (EP) . |

* cited by examiner

*Primary Examiner*—Matthew C. Graham
(74) *Attorney, Agent, or Firm*—Proskauer Rose LLP

(57) ABSTRACT

A method applicable for use in wheeled vehicles permits correction of a vehicle reference speed following a real or apparent deceleration indicated by wheel speed signals, caused for example by a fault in wheel sensing. In order to prevent a brief period of insufficient braking of the vehicle due to an erroneously high vehicle reference speed during a subsequent ABS regulation, wheel slip regulating signals are monitored. If a wheel slip regulating signal appears for a given number of wheels and lasts for a longer period than a predetermined time, an intervention in the normal regulating process is made, and the vehicle reference speed is set to the value of the wheel speed of the wheels associated with a wheel slip regulating signal.

5 Claims, 2 Drawing Sheets

METHOD FOR CORRECTING A VEHICLE REFERENCE SPEED

BACKGROUND OF THE INVENTION

The present invention relates to a method for correcting a vehicle reference speed following a real or apparent deceleration of wheel speed in a vehicle equipped with an anti-lock brake system.

Currently, many passenger vehicles are equipped with anti-lock brake systems (ABS). Commercial vehicles, as well, often utilize such technology, as disclosed for example in "Anti-Blockier-Systeme (ABS) für Nutzfahrzeuge" (Anti-lock Brake Systems for Commercial Vehicles), published by WABCO, 1991–1992. By adjusting the degree of wheel slippage during hard braking while traveling on a smooth road surface to a predetermined target value, i.e. approximately 15%, optimal braking of the vehicle is achieved, while at the same time the ability to effectively steer the vehicle is maintained.

Regulation of the wheel velocities during braking is based upon regulating signals produced by the electronic system comprising the ABS. These regulating signals generally include wheel acceleration signals (+b), wheel deceleration signals (−b), and wheel slip signals (λ). If one of the wheel velocities ($V_R$) has been reduced to below a vehicle reference speed ($V_{Ref}$), a wheel slip signal (λ) is produced for the particular wheel and, by means of braking pressure release, the wheel is given the opportunity to once again approach the vehicle reference speed ($V_{Ref}$). Therefore, in order to insure that the wheel slip signal (λ) is produced at the proper time, the vehicle reference speed ($V_{Ref}$) should ideally approximate, as closely as possible, the actual vehicle speed ($V_F$).

While driving without application of the brake and during periods when the brake is lightly applied, the vehicle reference speed ($V_{Ref}$) in a conventional ABS is generally set equal to the highest wheel speed ($V_R$). However, if during braking of the vehicle it is determined that the deceleration of the wheel speed ($V_R$) is occurring at more rapid a rate than would be physically possible for that of the entire vehicle, the vehicle reference speed ($V_{Ref}$) is no longer equated with the highest wheel speed ($V_R$), but instead follows a curve, the slope of which is less than that of the measured wheel speed ($V_R$). Under such conditions, conventional ABS electronic systems adjust the curve which the vehicle reference speed follows to approximately 0.8 g, where g represents ground acceleration.

Although occurring infrequently, there are however conditions under which the vehicle, either actually or apparently, undergoes greater deceleration than the above mentioned 0.8 g. For example, one such instance of a seemingly high rate of vehicle deceleration occurs in an accelerating all-wheel drive vehicle with spinning wheels as a result of a brief failure of the electronic system of the ABS and a subsequent resetting thereof. Following an ABS failure, for example, due to an interruption of the power supply caused by an intermittent contact, the system is automatically restarted. The value given the vehicle reference speed ($V_{Ref}$) at the time of restart will then be based upon the spinning wheels, and can therefore be attributed a value much higher than the actual vehicle speed ($V_F$). As a result, the ABS electronic system interprets the high vehicle reference speed ($V_{Ref}$) as an apparent sudden deceleration of the vehicle.

Should the driver of the vehicle attempt to apply the brakes in this operating state, the ABS electronic system incorrectly assumes that the wheels are already rotating too slowly as compared with the erroneously high vehicle reference speed ($V_{Ref}$). Consequently, sufficient optimal braking or, in the case of compressed air brakes, any further charging of the brake cylinders, is prevented by operation of the corresponding ABS regulating valves. This effect is present regardless of whether a partial or substantial braking action is initiated. It is therefore possible that optimum brake performance may be adversely affected for a few seconds following the above described system reset. Only after the erroneously excessive vehicle reference speed has returned to a value representative of the actual vehicle speed may the vehicle be decelerated in a normally intended manner.

An apparent high rate of vehicle deceleration may also occur as a consequence of an interference in sensing of wheel speed. The signal voltages produced by wheel speed sensors may be corrupted, for example, by mechanical vibrations and/or electromagnetic interference, such that wheel speed calculated from the sensory measurement far exceeds the actual vehicle speed.

The difference between the measured vehicle reference speed and the actual vehicle speed is interpreted by the electronic system of the ABS as an apparent abrupt deceleration. Although suitable filtering measures are generally taken to suppress such interference in the sensing of wheel speed, the above described false readings still, on occasion, occur.

The same effect can also occur due to an actual uneven road surface. In this case also, in spite of correct functioning wheel speed sensors, a too high vehicle reference speed can occur.

The above effect is not limited merely to apparent vehicle deceleration, but can also occur in the case of an actual, sudden vehicle deceleration due to an accident.

To solve the above stated problem, a separate vehicle deceleration sensor which would detect the actual vehicle deceleration and transmit the information to the electronic system of the ABS for correction of the erroneously high vehicle reference speed has been suggested. The high cost associated with such approach is, however, a disadvantage.

It is therefore an object of the invention to provide a method which shortens the duration of reduced brake performance due to actual or apparent abrupt vehicle deceleration by initiating a more rapid restoration of proper regulating capability of the ABS in an economical manner.

SUMMARY OF THE INVENTION

In accordance with these and other objects of the invention, there is provided a method applicable for use in wheeled vehicles which permits correction of a vehicle reference speed following a real or apparent deceleration indicated by wheel speed signals, caused for example by a fault in wheel sensing. In order to prevent a brief period of insufficient braking of the vehicle due to an erroneously high vehicle reference speed during a subsequent ABS regulation, wheel slip regulating signals are monitored. If a determination is made that the duration of a particular slip regulating signal is excessively long, the ABS electronic system begins to reduce vehicle reference speed to the actual wheel speed, thereby significantly shortening the period of reduced brake performance.

In accordance with an advantageous embodiment of the invention, if a wheel slip regulating signal appears for a given number of wheels, preferably at least three, and lasts longer than a predetermined time period, an intervention in the normal regulating process is made, and the vehicle reference speed is set to the value of the wheel speed of each of the wheels associated with a wheel slip regulating signal.

In a further embodiment, a counter is provided as part of the software of the ABS electronic system, which is incremented by one (1) whenever a wheel emits a slip signal lasting for a time longer than a preselected time period, a length of which may be adjusted.

The above, and other objects, features and advantages of the present invention will become apparent from the following description read in conjunction with the accompanying drawings.

DETAILED DESCRIPTION OF THE PREFERRED EMBODIMENT

Figure 1:
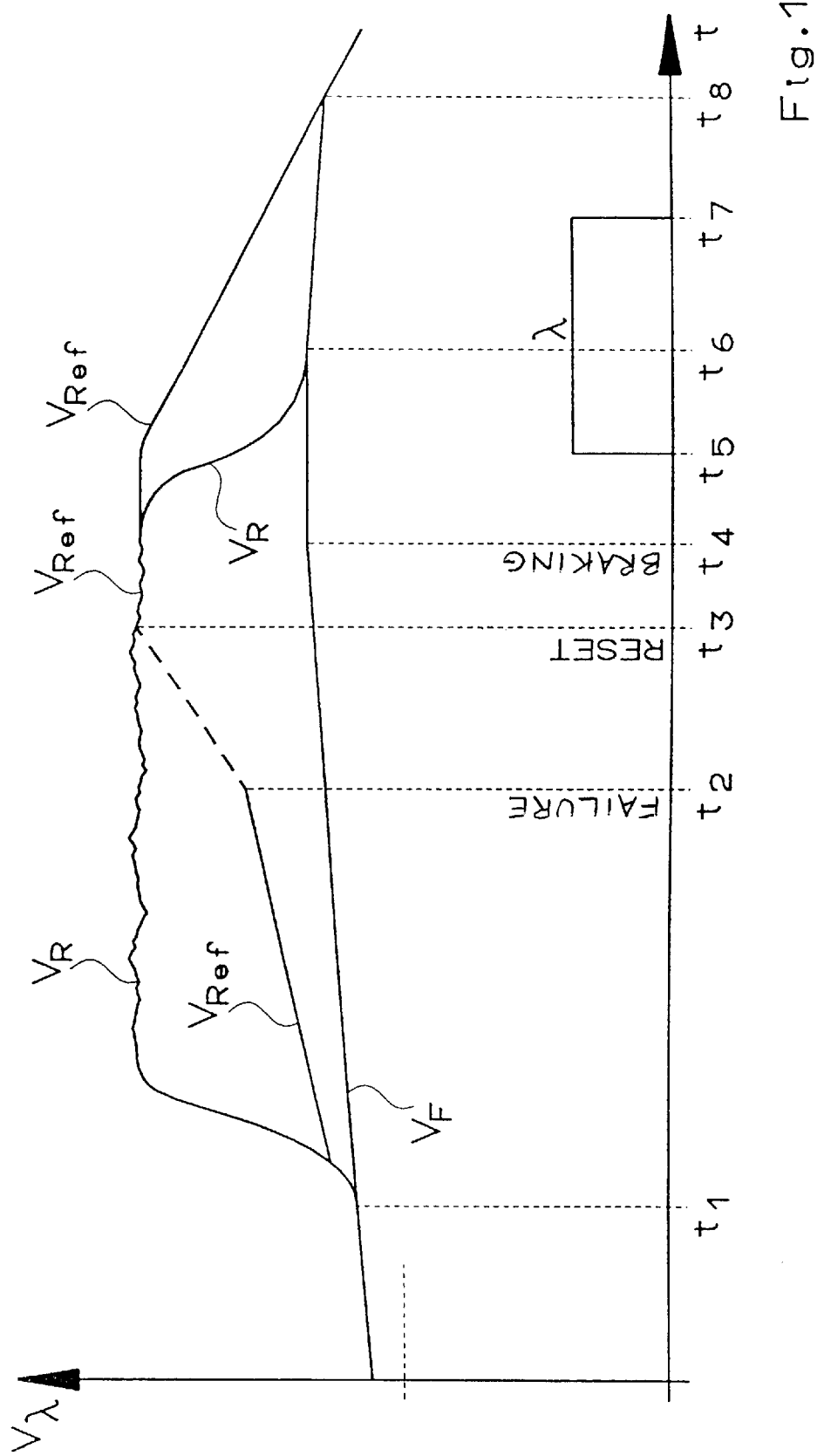
FIG. 1 is a graphical representation of a breaking operation following a reset of a conventional ABS electronic system employed in a all-wheel drive vehicle in which wheels of the vehicle are spinning independent of engaged contact with the ground, in which the evolution of wheel speed ($V_R$), vehicle speed ($V_F$), vehicle reference speed ($V_{Ref}$), and wheel slip regulating signal ($\lambda$) are plotted against time.

Referring to FIG. 1, the diagram shown graphically depicts the manner in which a conventional ABS reacts to an apparent sudden deceleration of the measured wheel speed. The representation is based on an all-wheel vehicle in which an interruption of the electronic system with subsequent reset takes place while the vehicle's wheels spin independent of engaged contact with the ground.

The vehicle, upon which the plotted data of FIG. 1 is based, is traveling at a normal, slightly accelerating rate of speed at a point in time $t_1$. Starting at point in time $t_1$, the wheels of the vehicle begin to spin. As evidenced from the plot of wheel speed $V_R$ vs. time t, wheel speed $V_R$ first accelerates steeply, and then levels off and remains approximately constant. Vehicle speed $V_F$ continues to increase slightly. Vehicle reference speed $V_{Ref}$ accelerates at a greater rate than vehicle speed $V_F$ as it attempts to approximate the speed $V_R$ of the spinning wheels.

At a point in time $t_2$, an ABS electronic system failure occurs, for example due to an intermittent contact. Subsequently, at a point in time $t_3$, the electronic system of the ABS begins to once again function. Upon start-up, the ABS electronic system is reset, thereby adjusting vehicle reference speed $V_{Ref}$ to a value equal to the speed of the most rapidly rotating wheel. As indicated by the plot of FIG. 1, the value of vehicle reference speed $V_{Ref}$ is erroneously far above actual vehicle speed $V_F$ following point in time $t_3$.

Following the above restart of the ABS electronic system, the driver initiates a braking action at a point in time $t_4$. As a result, wheel speed $V_R$ of the wheels decreases. As soon as wheel speed $V_R$ has dropped below the erroneously high vehicle reference speed $V_{Ref}$, a slip signal $\lambda$ is produced by the electronic system of the ABS at a point in time $t_5$. The duration of slip signal $\lambda$ lasts from point in time $t_5$ to a subsequent point in time $t_7$. At point in time $t_7$ vehicle reference speed $V_{Ref}$ and wheel speed $V_R$ have sufficiently approached a common value, and slip signal $\lambda$ is therefore discontinued. Vehicle reference speed $V_{Ref}$ follows the drop in wheel speed $V_R$, experiencing a delay in reaching agreement in value between point in time $t_4$ and a point in time $t_8$.

During the time period between point in time $t_5$ and point in time $t_7$ when slip signal $\lambda$ is produced, the ABS electronic system assumes that the wheels rotate too slowly, and therefore operates to prevent sufficient charging of the brake cylinders by inhibiting opening of the appropriate ABS regulating valves. Consequently, sufficient braking of the vehicle is prevented during the above time period, which may last several seconds.

At point in time $t_8$, wheel speed $V_R$ has again reached the actual vehicle speed $V_F$. Starting at point in time $t_8$, there is also agreement between vehicle reference speed $V_{Ref}$ and the actual vehicle speed $V_F$. Normal braking is therefore again possible.

Figure 2:
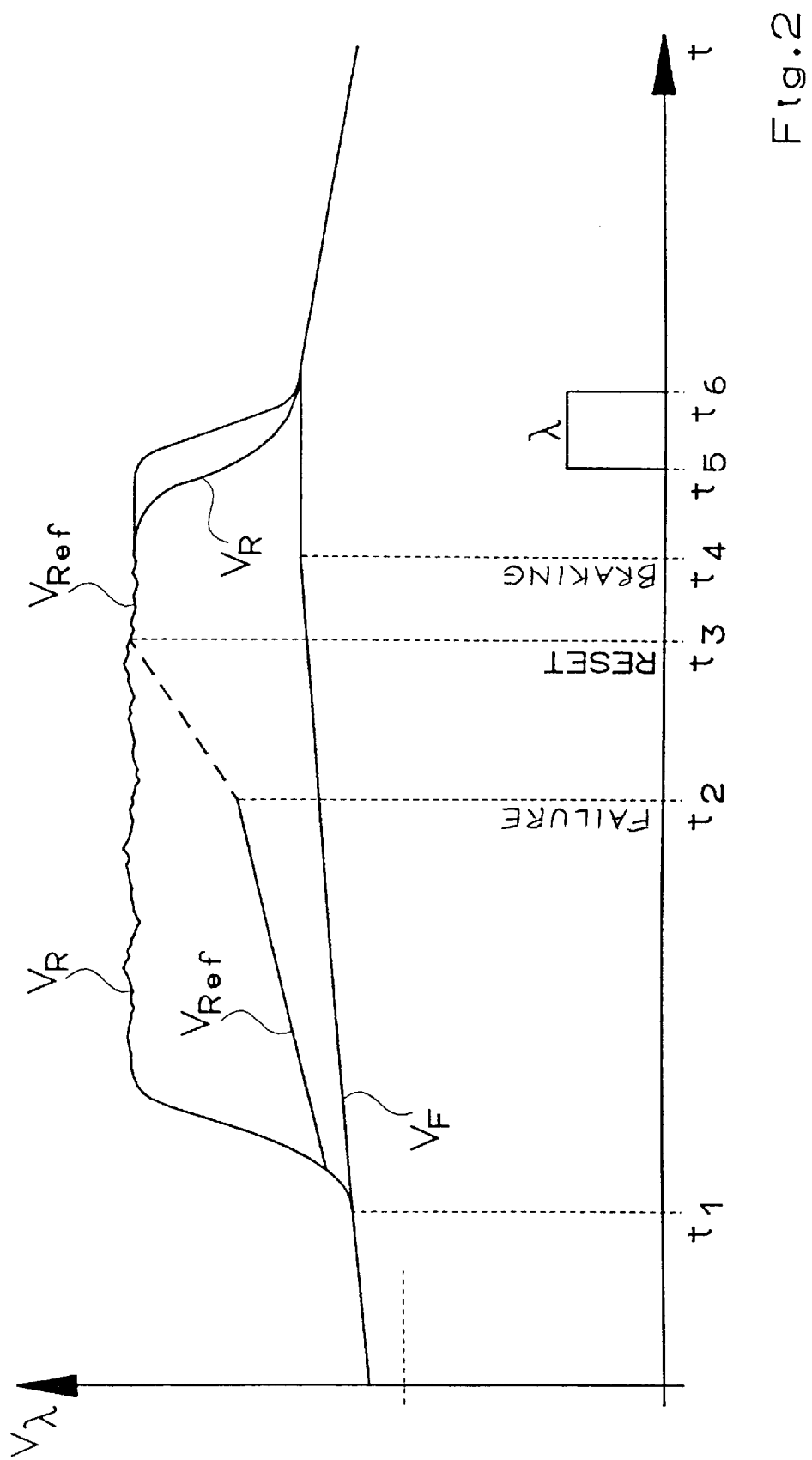
FIG. 2 is a graphical representation of corresponding data and conditions analogous with those of FIG. 1, in an ABS electronic system in accordance with embodiment of the invention.

Turning now to FIG. 2, corresponding conditions and data analogous with those of FIG. 1 are graphically depicted illustrating response thereto by an ABS electronic system which functions in accordance with the invention. Up to point in time $t_5$ the diagram is identical with that of FIG. 1. Starting at point in time $t_5$ however, the occurrence and duration of slip signal $\lambda$ is monitored by the electronic system of the ABS. If a determination is made that the duration of slip signal $\lambda$ is excessively long, the ABS electronic system already begins to reduce vehicle reference speed $V_{Ref}$ to the actual wheel speed $V_R$ shortly after point in time $t_5$. This reduction is not sudden, but rather attenuated. The time span during which the vehicle experiences insufficient braking capability is therefore shortened to the time period between point in time $t_5$ and subsequent point in time $t_6$, i.e. approximately one third of the duration associated with conventional ABS electronic systems. Starting at point in time $t_6$, optimal ABS-regulated braking can be resumed, if necessary, much earlier than with prior known systems. As a result, the entire braking distance can be reduced considerably by means of the invention.

For safety reasons, the ABS electronic system in accordance with embodiment of the invention advantageously monitors slip signal $\lambda$ of several wheels, i.e. preferably at least three wheels. The monitoring time, i.e. the period beginning at point in time $t_5$ in FIG. 2, at the end of which vehicle reference speed $V_{Ref}$ is adjusted to be equal to wheel speed $V_R$, is advantageously selected to be of sufficient length as not to occur inadvertently during normal ABS regulation, for example, about 0.5 seconds.

In a further embodiment in accordance with the invention, a counter is provided as part of the software of the ABS electronic system, which is incremented by one (1) whenever a wheel emits a slip signal $\lambda$ lasting for a time longer than a preselected time period. This preselected time period may be adjusted, and advantageously lies in the range of about 0.4 s to about 1.5 s. A corresponding value can be entered into the CPU of the ABS electronic system by programming.

The lowering of the vehicle reference speed $V_{Ref}$ to the highest of the current wheel speeds $V_R$ as described above, takes place when the value of the above mentioned counter is greater than the total number of sensed wheels less one (1), for example greater than three in the case of a four-wheel vehicle, and when at the same time wheel acceleration and deceleration signals (±b) are present. This approach insures proper functioning even when a wheel speed sensor might be defective. The monitoring of the regulating signals (±b) in turn serves to ensure that an eventually occurring proper ABS regulating operation will not be disturbed.

As illustrated in the accompanying figures, braking distance of a vehicle can be considerably shortened through practice of the invention.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A method for correcting a vehicle reference speed following a deceleration of wheel speed signals in a vehicle equipped with an anti-lock brake system in which wheel acceleration and deceleration signals and wheel slip regulating signals are generated, the method comprising of steps of:

setting a predetermined time;

monitoring the wheel slip regulating signals; and reducing a value of the vehicle reference speed to a value approximating that of a wheel speed when a generated wheel slip regulated signal is present for a given number of wheels and has a duration which exceeds said predetermined time period, wherein said step of reducing is carried out only when the content of the counter is greater than one less than a total number of sensed wheels of the vehicle and both the wheel acceleration and deceleration signals are absent.

2. A method according to claim 1, wherein said given number of wheels is one less than a total number of sensed wheels of the vehicle.

3. A method according to claim 1, wherein said predetermined time period is about 0.5 seconds.

4. A method according to claim 1, wherein the anti-lock brake system includes a counter, the method further comprising:

increasing a contents of the counter by one each time a one of said wheel slip regulating signals is present for a duration in excess of said predetermined time period.

5. A method according to claim 1, wherein a value of said predetermined time period is adjustable, and is in a range of from about 0.4 to about 1.5 seconds.

* * * * *